F. HOLLOMON.
LOCOMOTIVE OILING APPLIANCE.
APPLICATION FILED JULY 29, 1921.
1,432,557.
Patented Oct. 17, 1922.
2 SHEETS—SHEET 1.
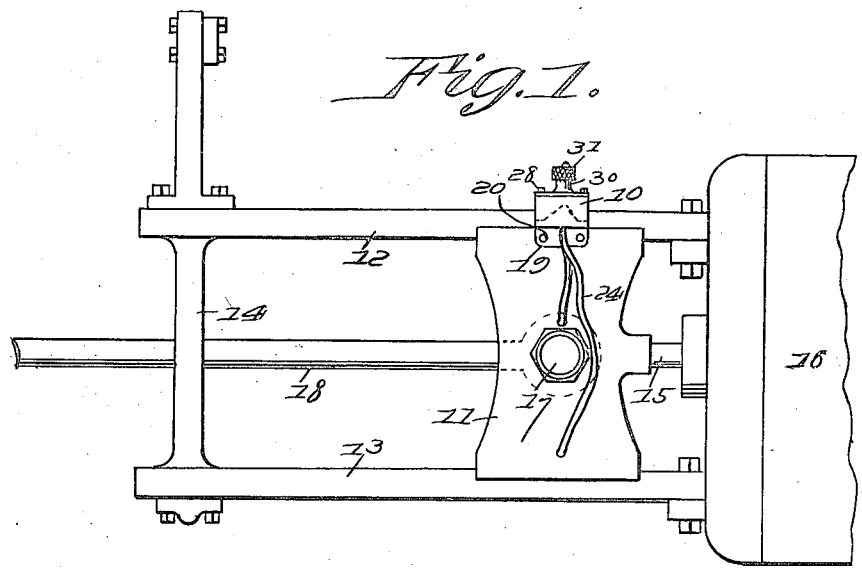
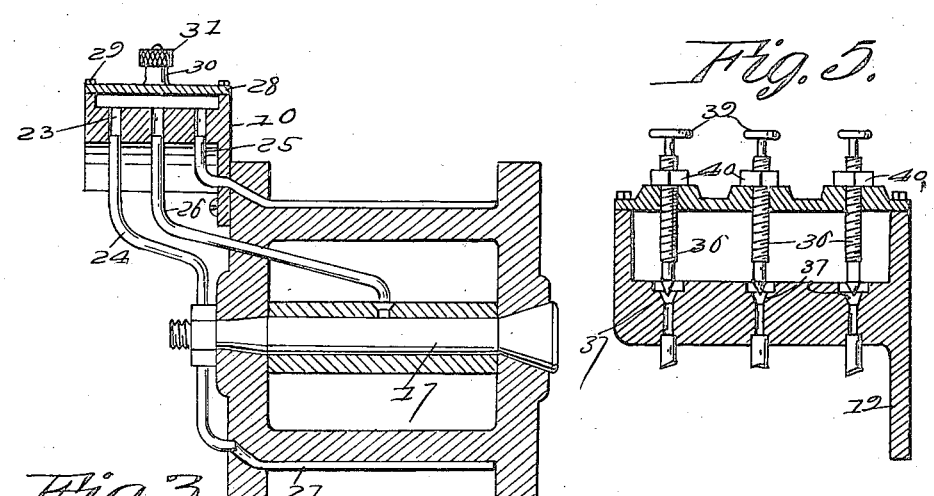
Inventor
Fred Hollomon, Patented Oct. 17, 1922.

1,432,557

UNITED STATES PATENT OFFICE.

FRED HOLLOMON, OF DUNNELLON, FLORIDA.

LOCOMOTIVE-OILING APPLIANCE.

Application filed July 29, 1921. Serial No. 488,330.

*To all whom it may concern:*

Be it known that FRED HOLLOMON, a citizen of the United States of America, residing at Dunnellon, in the county of Marion and State of Florida, has invented new and useful Improvements in Locomotive-Oiling Appliances, of which the following is a specification.

The object of the invention is to provide simple and efficient means for supplying oil economically to the cross head and connecting rod bearing therein of a locomotive driving gear, to overcome the insufficiencies and disadvantages of means heretofore employed for this purpose and consisting essentially of ordinary forms of oil and grease cups which are subject to interference in operation by accumulations of dust and dirt, and which require especial attention on the part of the engineer or other attendant to avoid the feeding of the lubricant whether the engine is at rest or in motion, and which, therefore, involves a wastage of the lubricating material; and more especially it is the object to provide an apparatus which can be readily applied to a cross head which while serving to feed oil only during the operation of the engine and hence when required, applies the lubricating material directly to the frictional surface of the cross head bearings and the connecting rod bearing in graduated quantities, regulable if desired to suit the conditions under which the engine is being operated, and thus insuring an economical use of the lubricant not only in the application thereof only to the surfaces requiring the same but in feeding the lubricant only when the engine is in operation and in a quantity suited to the work to be performed, and without requiring any attention upon the part of the engineer further than to fill the reservoir at stated intervals, with the assurance that a sufficient supply of the lubricating material will be maintained in proper condition and position for application to the bearing surfaces throughout the periods between the required filling operations; and with these objects in view the invention consists in a construction and combination of parts of which a preferred embodiment is shown in the accompanying drawings, wherein:—

Figure 1 is a side view of a lubricating apparatus constructed in accordance with the invention applied in the operative position to a cross head and related portions of a locomotive driving gear.

Figure 3 is an end view of the same partly broken away.

Figure 5 is a transverse sectional view of the tank or reservoir showing a modified construction wherein regulating needle valves are provided in connection with the lubricant feed ports.

Figure 2:
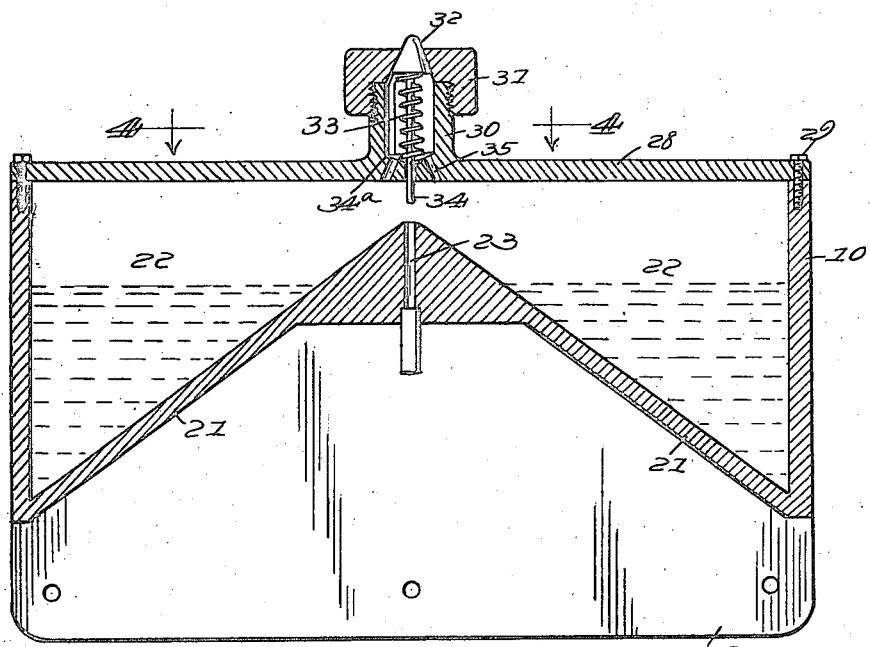
Figure 2 is an enlarged longitudinal sectional view of the oil tank or reservoir.
Figure 4:
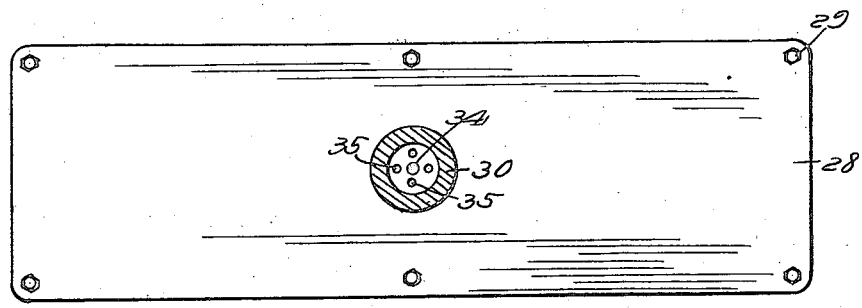
Figure 4 is a detail horizontal section on the plane indicated by the line 4—4 of Figure 2.

The apparatus consists essentially of a tank or reservoir 10 indicated in Figure 1 as applied to and carried by a cross head 11 mounted as in the ordinary practice for reciprocatory movement upon the upper and lower guides 12 and 13 connected by the usual bracket or support 14 and actuated by the piston rod 15 projecting from the cylinder indicated at 16, said cross head being provided with the usual bearing 17 for the pitman 18 by which motion is communicated to the driving wheels of the engine.

The tank or reservoir is provided with a depending bracket consisting of a plate 19 adapted to be secured by bolts 20 or like fastening means to the face of the cross head, and said tank or reservoir which is elongated in the direction of progress of movement of the cross head is provided with a double inclined shelving bottom 21 dividing the interior thereof into terminal oil chambers or compartments 22 separated by a tapered or wedge-shaped barrier at the transverse apex of which are arranged feed ports 23 over the inlet ends of which the oil passes as it surges from one end of the tank or reservoir or from one compartment thereof to the other in consequence of the longitudinal vibratory or reciprocatory movement incident to the motion to the cross head when the latter is in operation,—said inlet ends of the feed ports, however, being above the plane of the surface of the liquid contents of the chambers 22 when the cross head is at rest. Obviously in the passage of the oil over the apex of the barrier between the chambers a limited quantity finds its way into the feed ports and is thence conveyed by suitable conductors consisting for example of the tubes 24 to the oil ducts 25, 26 and 27 which communicate with the bearing surface of the cross head on the guide bars 12 and 13, and with the bearing of the pitman or connecting rod.

Thus at each stroke of the cross head, causing a surging of the oil over the wedge-shaped barrier between the oil containing chambers, a certain quantity of oil is deposited in the feed ports and is thence conveyed directly to the bearing surfaces to maintain them constantly in a proper condition, whereas when the engine is at rest the supply of oil is cut off and wastage is avoided.

In the construction illustrated the tank or reservoir is provided with a removable cover plate 28 secured in place by bolts 29 or the equivalents thereof, but it will be understood that the modification as in this feature to the extent of forming the top of the tank integral with the walls thereof is contemplated, and in order to give access to the tank or reservoir in order that the same may be charged with oil at suitable intervals, a filling tube 30 is arranged in communication with the same and is fitted with a removable cap 31 having a conical inwardly opening valve 32 yieldingly held seated by a spring 33 and provided with a guide stem 34, said valve being displaceable by the nozzle or spout of the oil can used for filling the tank and serving to cut off access to the tank when the filling operation has been completed so as to exclude dust or other foreign matter. The filling tube is preferably provided with a funnel like cavity 34ª into which the oil may be deposited when the valve 32 is displaced, and from which it flows through distributing ducts 35 into the chambers of the tank or reservoir at either side of the apex of the barrier.

In the modified construction illustrated in Figure 5 regulating needle valves 36 are arranged in operative relation with seats 37 at the upper ends of the feed ports by which oil is conveyed to the bearings, said valves being provided with grips 39 and being fitted with lock nuts 40, to the end that the inlet ends of the feed ports may be throttled to a greater or less extent to avoid the feeding of the oil more rapidly than is required to maintain a proper condition of the bearing sufaces.

Having described the invention, what is claimed as new and useful is:—

1. A lubricator for locomotive engine cross heads consisting of a tank or reservoir provided with means for attachment to the cross head and having terminal oil chambers or compartments disposed in the plane of vibration of the cross head and a barrier separating the chambers and formed with feed ports communicating with the bearings to be lubricated.

2. A lubricator for locomotive engine cross heads consisting of a tank or reservoir provided with means for attachment to the cross head and having terminal oil chambers or compartments disposed in the plane of vibration of the cross head and a barrier separating the chambers and formed with feed ports communicating with the bearings to be lubricated, said barrier having upwardly convergent walls meeting in the plane of said feed ports.

3. A lubricator for locomotive engine cross heads having a tank or reservoir elongated in the direction of movement of the cross head and provided with means for attachment thereto, said tank or reservoir having a double inclined bottom consisting of upwardly convergent portions intersecting midway of the length of the tank or reservoir to form a transverse barrier defining terminal oil receiving chambers or compartments, the said barrier having feed ports arranged with their inlet ends at its apex.

4. A lubricator for the cross heads of locomotive engines and adapted to be carried thereby, the same having a tank or reservoir elongated in the direction of movement of the cross head and provided with terminal oil containing chambers or compartments, an interposed upwardly tapered barrier separating the chambers and formed in its apex with feed ports leading to the bearings to be lubricated, and a filling nozzle communicating with the interior of the tank or reservoir and provided with a spring pressed inwardly opening valve.

5. A lubricator for the cross heads of locomotive engines and adapted to be carried thereby, the same having a tank or reservoir elongated in the direction of movement of the cross head and provided with terminal oil containing chambers or compartments, an interposed upwardly tapered barrier separating the chambers and formed in its apex with feed ports leading to the bearings to be lubricated, and a filling nozzle having a removable cap and an inwardly opening spring pressed valve seated in said cap.

6. A lubricator for the cross heads of locomotive engines and adapted to be carried thereby, the same having a tank or reservoir elongated in the direction of movement of the cross head and provided with terminal oil containing chambers or compartments, an interposed upwardly tapered barrier separating the chambers and formed in its apex with feed ports leading to the bearings to be lubricated, and a filling nozzle in communication with the tank or reservoir and provided with an inwardly opening spring seated valve, said nozzle having a filling chamber in communication with the interior of the tank by oil distributing ducts.

7. A lubricator for the cross heads of locomotive engines and adapted to be carried thereby, the same having a tank or reservoir elongated in the direction of movement of the cross head and provided with terminal oil containing chambers or compartments, an interposed upwardly tapered barrier separating the chambers and formed in its apex with feed ports leading to the bearings to be lubricated, and a filling nozzle in communication with the tank or reservoir and provided with an inwardly opening spring seated valve, said nozzle having a filling chamber in communication with the interior of the tank by oil distributing ducts and serving as a housing for the valve actuating spring.

In testimony whereof he affixes his signature.

FRED HOLLOMON.